No. 789,931. PATENTED MAY 16, 1905.
E. F. PAWASARAT.
TOOL FOR REPAIRING PNEUMATIC TUBING.
APPLICATION FILED JAN. 6, 1905.

WITNESSES:
O. P. Erwin
Nellie J. Taugher

INVENTOR.
Ewald F. Pawasarat
BY Erwin & Wheeler
ATTORNEYS.

No. 789,931.                                    Patented May 16, 1905.

UNITED STATES PATENT OFFICE.

EWALD F. PAWASARAT, OF SHEBOYGAN, WISCONSIN.

TOOL FOR REPAIRING PNEUMATIC TUBING.

SPECIFICATION forming part of Letters Patent No. 789,931, dated May 16, 1905.

Application filed January 6, 1905. Serial No. 239,891.

*To all whom it may concern:*

Be it known that I, EWALD F. PAWASARAT, a citizen of the United States, residing at Sheboygan, county of Sheboygan, and State of Wisconsin, have invented new and useful Improvements in Tools for Repairing Pneumatic Tubing, of which the following is a specification.

My invention relates to improvements in that class of tools for repairing pneumatic tubing by which punctures or other apertures in the tire are closed by the insertion of strips of soft rubber or other soft elastic substance, together with a small quantity of liquid cement; and it pertains more especially, first, to the device for holding the elastic strips taut or in an expanded condition preparatory to being inserted in the puncture, and, second, to the trough-shaped grooves formed upon the respective sides of a needle of the tool for the reception of the elastic strips and the liquid cement, whereby the strips are more readily inserted through the aperture and whereby the fluid cement with which the strips are saturated can be forced through the aperture without being wiped off by contact with the walls of the pneumatic tube through which they are inserted.

The construction of my invention is explained by reference to the accompanying drawings, in which—

Figure 1:
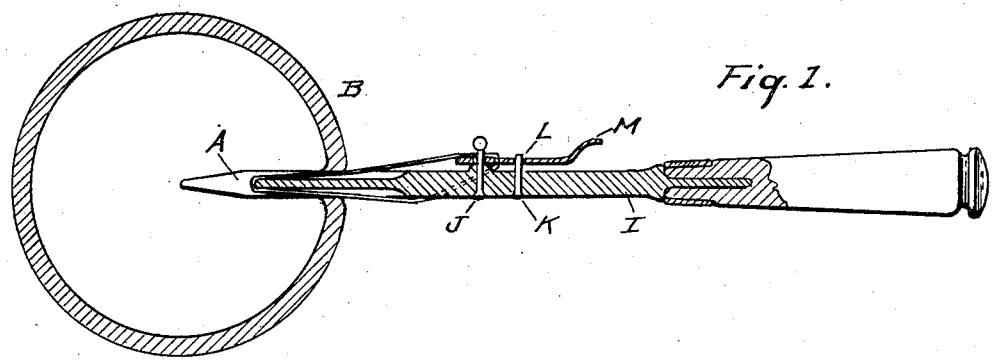
Figure 2:
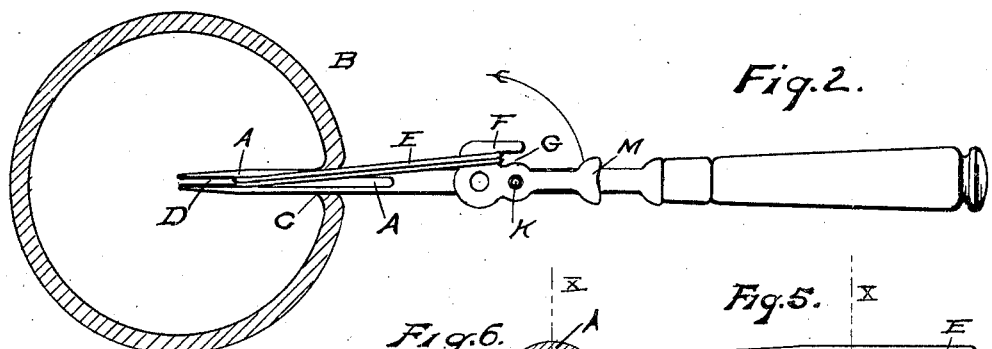
Figure 6:
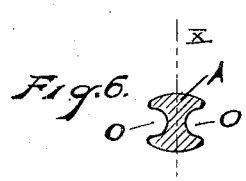
Figure 5:
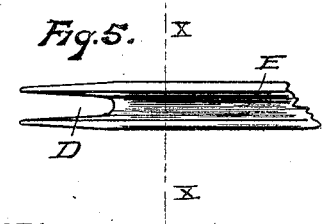
Figure 3:
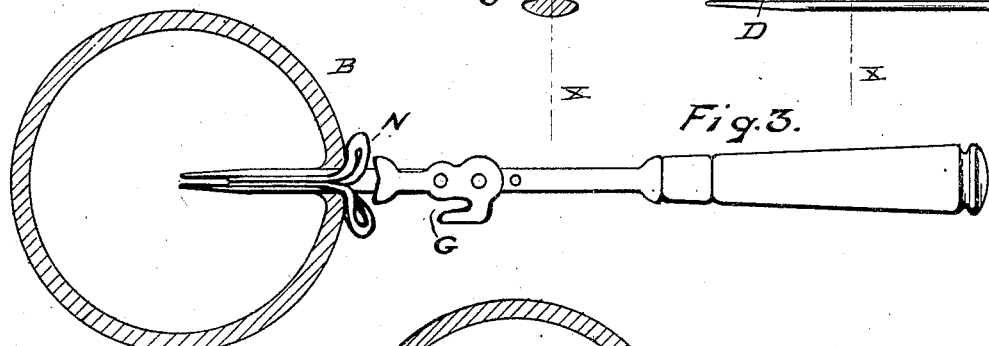
Figure 4:
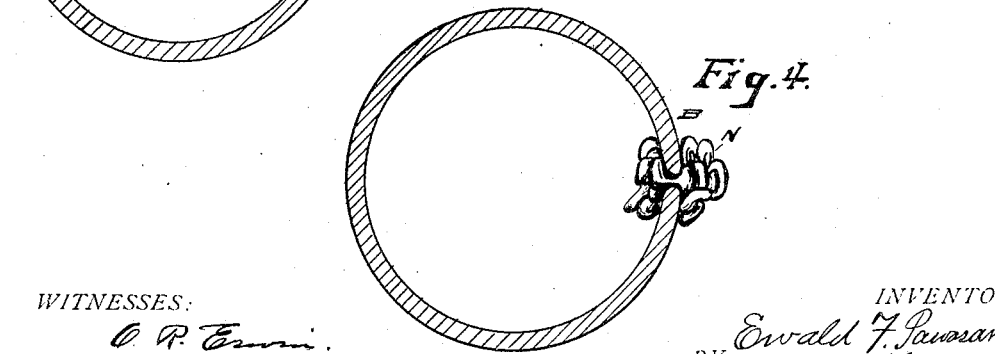

Figure 1 represents a longitudinal section of the tool as shown in connection with a pneumatic tube in the aperture of which the tool is inserted. Fig. 2 is a front view of the tool in connection with the pneumatic tube, showing the position of the device for holding the elastic strips in a taut position preparatory to being inserted in the tubing. Fig. 3 is a similar view to that shown in Fig. 2, showing the position of the device for holding the rubber strips in its reverse position, the rubber strips being released therefrom. Fig. 4 represents a transverse section of a pneumatic tube with the rubber strips inserted. Fig. 5 is a detail showing an enlarged view of the needle of the tool, and Fig. 6 is a transverse section drawn on line $x$ $x$ of Fig. 5.

Like parts are identified by the same reference-letters throughout the several views.

A represents the needle by which the rubber strips are inserted in the pneumatic tube B through an aperture C. The needle A is provided at its front or pointed end with a longitudinal groove D for the reception of the folds of the elastic strips E. The elastic strips are usually made up of ordinary elastic bands, such as are employed for holding papers, &c., and the several folds are usually employed for stopping the puncture. Preparatory to inserting the rubber strips they are folded centrally in the groove or recess D and the free ends are drawn back and folded around the retaining-bracket F within the groove G. The elastic strips may be folded a greater or less number of times, according to the dimensions of the puncture which is to be stopped, and the position of the bracket F is such as to retain the bands in an expanded or taut condition while they are being inserted in the aperture. The bracket F is permanently but loosely secured to the shank I of the tool upon the pivot J, and said bracket is locked in line with the shank and handle of the tool when the rubber bands or strips are wound thereon, said bracket being held in place by engagement of the pin K in the aperture L of the bracket, as shown in Figs. 1 and 2. When the bracket is thus secured in place upon the pin, the elastic bands will be retained in their taut position until inserted in the tubing. This being done, the rear end M of the bracket is raised slightly and disengaged from the pin, when said bracket will be turned in the reverse position upon its pivotal support J from that shown in Figs. 1 and 2 to that shown in Fig. 3, whereby the folded ends N of the rubber strips will be released from the recess G of the bracket, when the needle of the tool may be withdrawn from the puncture, thus leaving the rubber in the position indicated in Fig. 4. The respective sides of the needle are provided with longitudinal grooves or recesses O O for the reception of the elastic strips E, whereby when said strips are in place in the needle they come within the line described by the circumference thereof and the needle may be more easily inserted through the puncture and also whereby the liquid cement with which the elastic bands have previously been coated will adhere to said bands and be carried through the apertures and be less liable to be wiped off by contact with the walls of the pneumatic tube through which the instrument is being inserted.

Having thus described my invention, what I claim as new, and desire to secure by Letters Patent, is—

1. In a pneumatic repair-tool of the class described, the combination of a needle provided in its front end with an aperture for the reception of strips of elastic material; a bracket provided with a recess for the reception of the folded elastic strips to be inserted, pivotally connected to the side of the needle; a transverse bracket-retaining pin rigidly affixed to the shank of the needle beneath said bracket, said bracket being provided with an aperture for the reception of said retaining-pin, substantially as set forth.

2. In a pneumatic repair-tool of the class described, a needle provided with a longitudinal band-receiving recess at its front end and with two longitudinal grooves extending rearwardly toward the shank of the tool; a bracket pivotally connected to the side of the shank provided with a recess for the reception of the elastic bands and with an aperture for the reception of a bracket-retaining pin; a transverse bracket-retaining pin rigidly affixed to the side of the shank of said tool and adapted to engage in the perforation in said bracket and hold said bracket in place against the recoil of the elastic bands connected therewith, all substantially as and for the purpose specified.

In testimony whereof I affix my signature in the presence of two witnesses.

EWALD F. PAWASARAT.

Witnesses:
LEOPOLD GUTSCH,
EDWARD RUPPELT.